(12) United States Patent
Kang

(10) Patent No.: US 9,555,951 B2
(45) Date of Patent: Jan. 31, 2017

(54) VACUUM CONTAINER AND METHOD FOR MANUFACTURING SAME

(76) Inventor: Sungil Kang, Sungnam (KR)

( * ) Notice: Subject to any disclaimer, the term of this patent is extended or adjusted under 35 U.S.C. 154(b) by 0 days.

(21) Appl. No.: 14/355,526

(22) PCT Filed: Jul. 20, 2012

(86) PCT No.: PCT/KR2012/005827
§ 371 (c)(1),
(2), (4) Date: Apr. 30, 2014

(87) PCT Pub. No.: WO2013/065928
PCT Pub. Date: May 10, 2013

(65) Prior Publication Data
US 2014/0291351 A1    Oct. 2, 2014

(30) Foreign Application Priority Data
Nov. 1, 2011    (KR) .................. 10-2011-0113014

(51) Int. Cl.
| | | |
|---|---|---|
| *B65D 35/56* | (2006.01) | |
| *B65D 83/00* | (2006.01) | |
| *B29C 51/16* | (2006.01) | |
| *B29D 22/00* | (2006.01) | |
| *B29C 51/10* | (2006.01) | |
| *B29C 65/00* | (2006.01) | |

(Continued)

(52) U.S. Cl.
CPC ......... *B65D 83/0094* (2013.01); *B29C 51/162* (2013.01); *B29D 22/003* (2013.01); *B29C 51/10* (2013.01); *B29C 65/08* (2013.01); *B29C 66/1282* (2013.01); *B29C 66/12841* (2013.01); *B29C 66/131* (2013.01); *B29C 66/542* (2013.01); *B29C 2791/006* (2013.01); *B29L 2009/001* (2013.01); *B29L 2031/7156* (2013.01); *Y10T 156/1062* (2015.01)

(58) Field of Classification Search
CPC ... B65D 83/0094; B29C 51/162; B29C 51/10; B29C 65/08; B29C 66/1282; B29C 66/12841; B29C 66/131; B29C 66/542; B29C 2791/006; B29D 22/003; Y10T 156/1062
USPC .......... 222/1, 105, 386.5, 383.1, 389, 321.1, 222/321.7, 321.9, 95
See application file for complete search history.

(56) References Cited

U.S. PATENT DOCUMENTS 5,292,033 A * 3/1994 Gueret ................ B05B 11/0043
222/105
5,454,488 A * 10/1995 Geier .................... B05B 11/007
222/214

(Continued)

FOREIGN PATENT DOCUMENTS

| JP | 11-029178 A | 2/1999 |
|---|---|---|
| JP | 2003-053858 A | 2/2003 |

(Continued)

OTHER PUBLICATIONS

WO 2011099675—English Translation, machine generated Aug. 2015.*

(Continued)

*Primary Examiner* — J. Casimer Jacyna
*Assistant Examiner* — Benjamin R Shaw

(57) ABSTRACT

The present invention relates to a vacuum container in which a periphery of an inner container, a periphery of a film container, and an inner container cover are bonded through ultrasonic wave fusion and a method of manufacturing the same.

4 Claims, 6 Drawing Sheets

(51) Int. Cl.
*B29L 31/00* (2006.01)
*B29L 9/00* (2006.01)
*B29C 65/08* (2006.01)

(56) References Cited

U.S. PATENT DOCUMENTS

| | | | | |
|---|---|---|---|---|
| 6,073,805 | A * | 6/2000 | Gueret | B05B 11/0013 |
| | | | | 222/105 |
| 6,622,890 | B2 * | 9/2003 | Gueret | B05B 7/2462 |
| | | | | 222/1 |
| 6,945,428 | B2 * | 9/2005 | Shimizu | B65D 83/0055 |
| | | | | 222/105 |
| 6,983,864 | B1 * | 1/2006 | Cagle | B05B 11/0005 |
| | | | | 222/131 |
| 2005/0067432 | A1 * | 3/2005 | Bonneyrat | B05B 11/0043 |
| | | | | 222/105 |
| 2008/0296320 | A1 * | 12/2008 | Kang | A45D 34/042 |
| | | | | 401/156 |

FOREIGN PATENT DOCUMENTS

| | | |
|---|---|---|
| JP | 2004-067235 A | 3/2004 |
| KR | 10-2006-0120432 A | 11/2006 |
| KR | 10-2010-0128968 A | 12/2010 |
| WO | WO 2011099675 A1 * | 8/2011 |

OTHER PUBLICATIONS

Internatlonal Search Report of PCT/KR2012/005827.
Written Opinion of the International Searching Authority of PCT/KR2012/005827.

* cited by examiner

VACUUM CONTAINER AND METHOD FOR MANUFACTURING SAME

RELATED APPLICATION

This application is the National Stage of International Application No. PCT/KR/2012/005827, filed Jul. 20, 2012, which claims benefit of foreign priority of Korean Patent Application No. 10-2011-0113014, filed Nov. 1, 2011, which is incorporated by reference in its entirety into this application.

TECHNICAL FIELD

The present invention relates to a vacuum container and a method of manufacturing the same, and more particularly to a vacuum container in which a periphery of an inner container, a periphery of a film container, and an inner container cover are bonded through ultrasonic wave fusion and a method of manufacturing the same.

BACKGROUND ART

In general, domestic liquid products include cosmetics, medicines, and synthetic detergents, and are mainly preserved in a container formed of a synthetic resin such that a consumer opens a plug to use the products. However, when the plug is opened and closed to discharge the liquid product, a user uses the product while gripping and inclining the container, so that foreign substances penetrate into the container. Thus, a discharge pump is installed at an inlet of a container accommodating a liquid product such that contents may be pumped upwards.

FIG. 1 is an exemplary sectional view of a discharge pump according to the related art.

As shown in FIG. 1, the discharge pump 100 includes a press button 110 directly pressed by a user to discharge contents, an elevation member 120 elevating in association with movement of the press button 110, a cylinder 130 accommodated by the elevation member 120, an operation piston 131 installed within the cylinder 130 to move the contents upwards while elevating in association with the elevation of the elevation member 120, a check valve 133 operated to move the contents in the container only upwards. As well known to those skilled in the art, a raising piston P for pushing the contents stored in the container toward the discharge pump 100 as the contents are discharged by an operation of the discharge pump 100 is installed on an inner bottom of the container.

However, because the container should be higher by a height occupied by the raising piston P due to characteristics of the raising piston in which the contents in the container are pushed upwards toward an inlet of the container, it is impossible to install the discharge pump 100 in a cosmetics container such as a compact container having a small height.

Further, even when the raising piston P reaches a top point, an excessive amount of cosmetics are left because a large space is left at a periphery of the raising piston P and the discharge pump 100.

DISCLOSURE

Technical Problem

The present invention has been made in an effort to solve the above-described problems, it is an object of the present invention to provide a vacuum container which includes a film container a size of which is reduced as contents are discharged instead of a raising piston such that an overall height thereof can be reduced by the height of the raising piston, so that an airless pump is mounted to a cosmetics container such as a compact container having a small height, and a method of manufacturing the same.

Another object of the present invention is to provide a vacuum container which includes a film container a size of which is reduced as contents are discharged, and a method of manufacturing the same.

Technical Solution

In accordance with an aspect of the present invention, there is provided a method of manufacturing a vacuum container, the method including: an inner container forming step of forming an inner container of a synthetic resin; a thin film disposing step of positioning a thin film formed of any one of polypropylene (PP), polyethylene (PE), polyethyleneterephthalate, acrylonitrile butadiene styrene copolymer (ABS), poly cyclohexylene dimethylene terephthalate (PCTG), polyvinyl alcohol (PVA), polyurethane (PU), polyvinylchloride (PVC), saline, a silicon resin, a natural rubber, or a synthetic resin on the inner container; a film container forming and attaching step of heating an upper side of the thin film positioned on the inner container with hot air or a heating plate and suctioning air through vacuum suction hole formed on a bottom plate of the inner container at the same time to attaching the thin film into the inner container while forming the thin film together with an inner shape of the inner container; a film container cutting step of cutting a periphery of the film container formed in the inner container and attached to the inner container according to a size of a periphery of the inner container; and a cover bonding step of covering an inner container cover on the inner container and the film container while the film container is attached to the inner container, and bonding the periphery of the inner container, the periphery of the film container, and the inner container cover.

In the cover bonding step, the periphery of the inner container, the periphery of the film container, and the inner container cover are bonded through ultra-wave fusion.

In the film container forming and attaching step, a temperature of the hot air or the heating plate is 90° C. to 140° C. when the film container is formed.

In the film container forming and attaching step, a temperature of the hot air or the heating plate is 110° C. to 120° C. when the film container is formed.

In accordance with another aspect of the present invention, there is a vacuum container including: an inner container 20 having an opened upper side and having a vacuum suction hole 24 on a bottom thereof; a film container 32 attached to an interior of the inner container 20; an inner container cover 40 bonded to an periphery of the inner container and an upper portion of a periphery of the film container 32 to interrupt an upper portion of the inner container 20 from the outside and having a hole 41 at the center thereof; and a discharge pump 60 formed in the hole 41 of the inner container cover 40.

The inner container 20 has an annular groove 23 on an outer surface thereof, a protrusion 21 formed at an upper portion of the inner container 20, and an annular step 22 formed outside the protrusion 21.

The annular groove 23 is undercut-coupled to an annular step 52 of a vacuum container accommodating member 51 formed in a cosmetics compact case 50.

A button 61 for operating the discharge pump is installed at an upper portion of the discharge pump 60, and a periphery of the button 61 is undercut-coupled to the annular step 21 of the inner container 20.

A periphery of the inner container 20, a periphery of the film container 32, and the inner container cover 40 are fused by ultrasonic waves.

Advantageous Effects

The present invention provides a vacuum container which includes a film container a size of which is reduced as contents are discharged instead of a raising piston such that an overall height thereof can be reduced by the height of the raising piston, so that an airless pump is mounted to a cosmetics container such as a compact container having a small height, and a method of manufacturing the same The present invention also provides a vacuum container which includes a film container a size of which is reduced as contents are discharged, and a method of manufacturing the same.

DESCRIPTION OF DRAWINGS

FIG. 2 shows a method of forming a vacuum container according to the present invention, in which

BEST MODE

[Mode for Invention]

Hereinafter, the present invention will be described in detail with reference to the accompanying drawings.

According to the present invention, a vacuum container is formed by the following manufacturing method.

Figure 1:
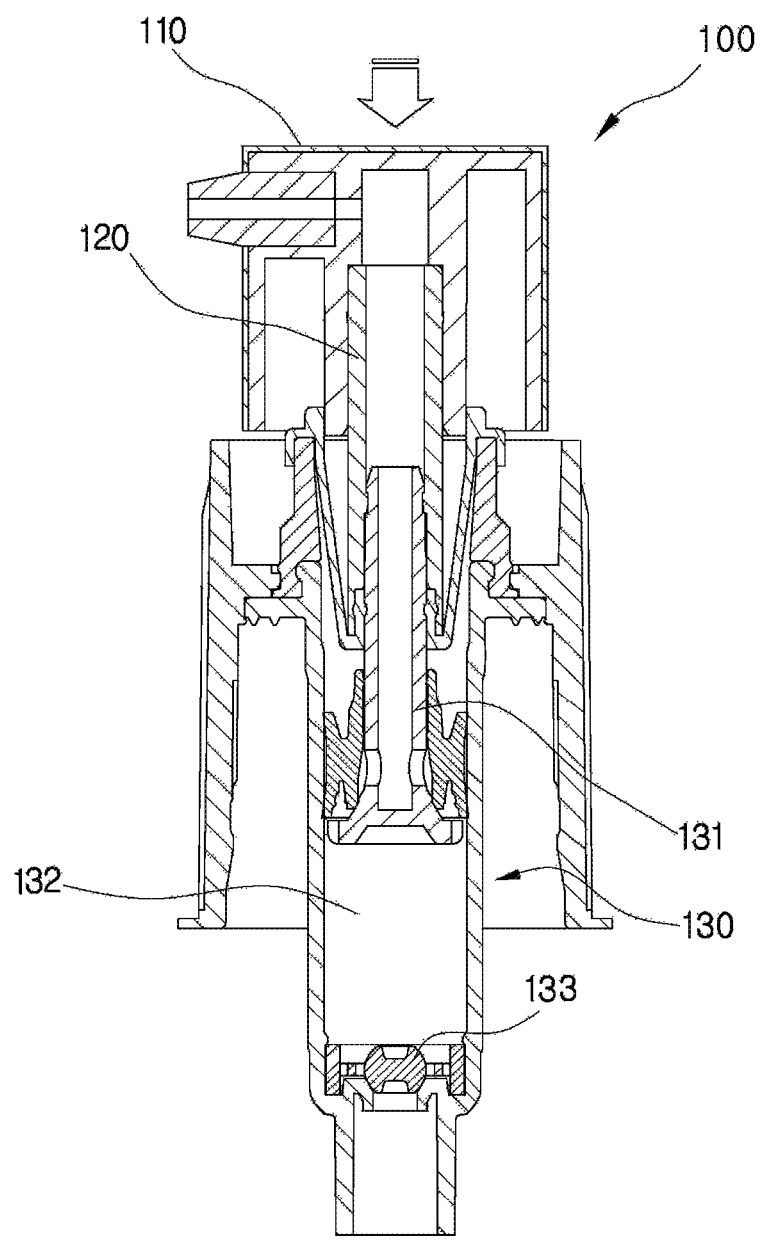
FIG. 1 is an exemplary sectional view of a discharge pump according to the related art.
Figure 2A:
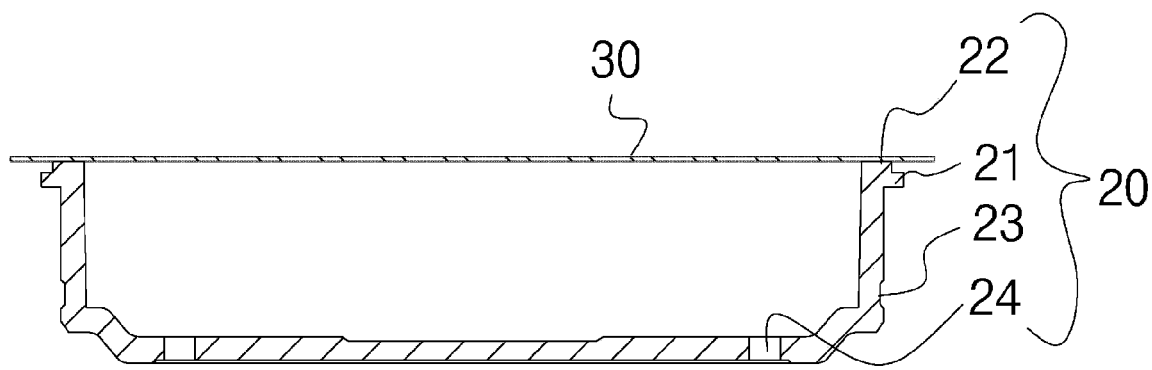
FIG. 2A shows a state in which a thin film is disposed on an inner container.
Figure 2B:
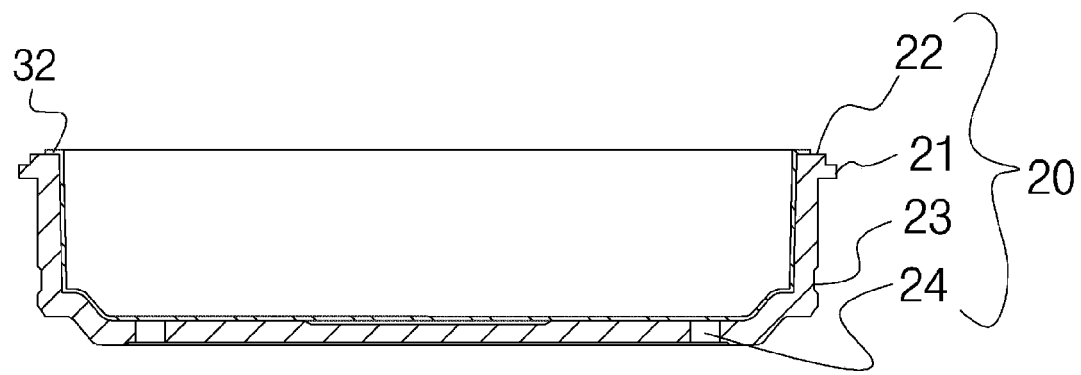
FIG. 2B shows a state in which a film container is attached to the inner container while being formed.
Figure 2C:
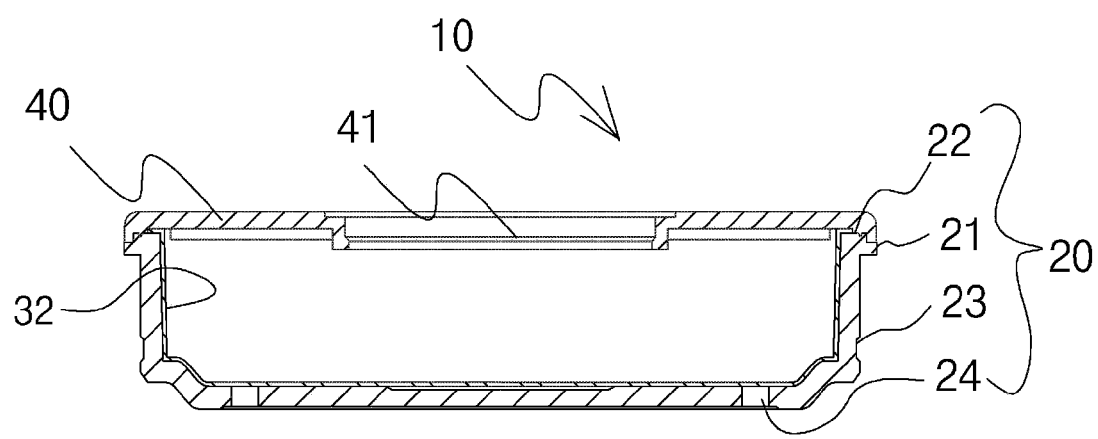
FIG. 2C shows a state in which an inner container cover fused by ultrasonic waves after covering an upper side of the inner container and the film container.

That is, the vacuum container 10 is manufactured through an inner container forming step of forming an inner container 20 of a synthetic resin;

a thin film disposing step of positioning a thin film 30 formed of any one of polypropylene (PP), polyethylene (PE), polyethyleneterephthalate, acrylonitrile butadiene styrene copolymer (ABS), poly cyclohexylene dimethylene terephthalate (PCTG), polyvinyl alcohol (PVA), polyurethane (PU), polyvinylchloride (PVC), saline, a silicon resin, a natural rubber, or a synthetic resin on the inner container 20 as shown in FIG. 2A;

a film container forming and attaching step of heating an upper side of the thin film 30 positioned on the inner container 20 with hot air or a heating plate and suctioning air through vacuum suction hole 24 formed on a bottom plate of the inner container 20 at the same time to attaching the thin film 30 into the inner container 20 while forming the thin film 30 together with an inner shape of the inner container 20 as shown in FIG. 2B; a film container cutting step of cutting a periphery of the film container 32 formed in the inner container 20 and attached to the inner container 20 according to a size of a periphery of the inner container 20; and a cover bonding step of covering an inner container cover on the inner container and the film container while the film container is attached to the inner container, and bonding the periphery of the inner container, the periphery of the film container, and the inner container cover as shown in FIG. 2C.

Here, in the cover bonding step, it is preferable that the periphery of the inner container, the periphery of the film container, and the inner container cover are bonded through ultrasonic wave fusion.

In addition, it is preferable that the most efficient temperature of the hot air or the heating plate (not shown) is 90° C. to 140° C. when the film container 32 is attached to the inner container 20 while being formed. Here, when the temperature of the hot air or the heating plate is not more than 90° C., a speed at which the thin film 30 is softened is too slow, and when the temperature of the hot air or the heating plate is not less than 90° C., the thin film 30 may be melted. Thus, it is preferable that the temperature of the hot air or the heating plate (not shown) is 90° C. to 140° C. In addition, it is more preferable that a temperature of the hot air or the heating plate is in a section of 90° C. to 140° C., in particular, in a section of 110° C. to 120° C. in which the thin film 30 is softened well and a forming speed of the film container 32 is high.

Hereinafter, a configuration of the vacuum container 10 will be described.

That is, as shown in FIGS. 2A, 2B, and 2C, the vacuum container 10 includes an inner container 20 having an opened upper side and having a vacuum suction hole 24 on a bottom thereof, a film container 32 attached to an interior of the inner container 20, an inner container cover 40 bonded to an periphery of the inner container and an upper portion of a periphery of the film container 32 to interrupt an upper portion of the inner container 20 from the outside and having a hole 41 at the center thereof; and a discharge pump 60 formed in the hole 41 of the inner container cover 40.

Here, the inner container 20 has an annular groove 23 on an outer surface thereof, a protrusion 21 formed at an upper portion of the inner container 20, and an annular step 22 formed outside the protrusion 21. Here, a periphery of the inner container 20, a periphery of the film container 32, and the inner container cover 40 are formed by ultrasonic waves.

The discharge pump 60 is provided to discharge contents filled in the film container 32, a button 61 is installed at an upper portion of the discharge pump 60, and a periphery of the button 61 is undercut-coupled to the annular step 21 of the inner container 20.

An annular groove 23 of the inner container 20 is coupled to a catching step 52 of a vacuum container accommodating member 51 formed in the cosmetics compact case 50 to correspond to the catching step 52.

The vacuum suction hole 24 formed on the bottom of the inner container 20 is an air passage used when air is suctioned from the outside such that the film container 32 is attached to the inner container 20 while being formed.

Figure 5:
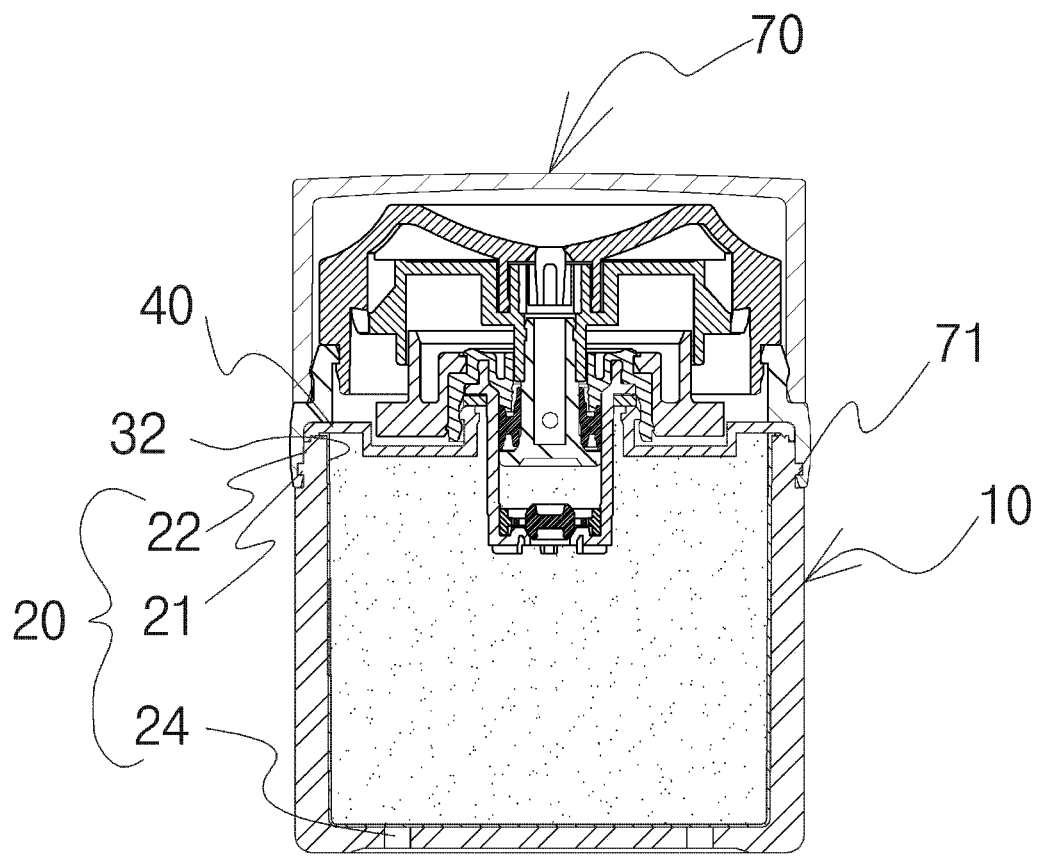
FIG. 5 is a sectional view of an airless cosmetics container in which a vacuum container is disposed according to another embodiment of the present invention.

When the vacuum container 10 of the present invention is mounted to an airless cosmetics container 70, a pump having the same structure as that of the discharge pump 60 mounted to the compact case 50, which is a known technology, and a detailed description thereof will be omitted and the reference numeral of the discharge pump 60 is used for the pump for the airless cosmetic container 70. Meanwhile, as shown in FIG. 5, when the vacuum container 10 is mounted to the airless cosmetics container 70, a cosmetic shoulder 71 is undercut-coupled to an annular step 21 of the vacuum container 10.

Figure 3:
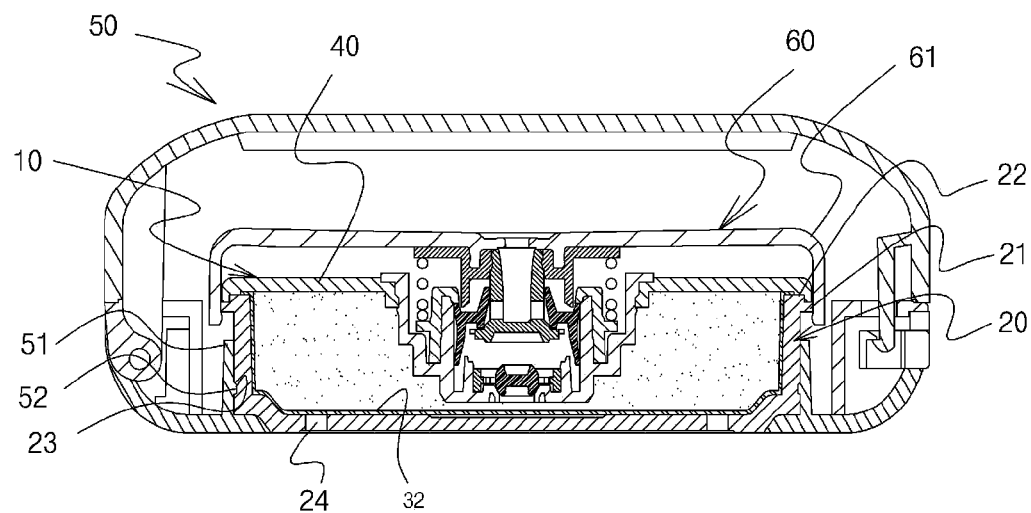
FIG. 3 is a sectional view of a cosmetics compact case in which a vacuum container is disposed according to an embodiment of the present invention.

Further, as shown in FIG. 3, when the vacuum container 10 of the present invention is mounted to the cosmetics compact case 50, an annular step 52 of the vacuum accommodating container 51 formed in a cosmetics compact case 50 is undercut-coupled to the annular groove 23 formed on an outer surface of the inner container 20.

Accordingly, an outer shape of the cosmetics compact case is formed.

Hereinafter, an operation of the vacuum container 10 installed in the cosmetics compact case 50 will be described.

Here, the discharge pump 60 is well known to those skilled in the art, and a detailed description thereof will be omitted.

Figure 4:
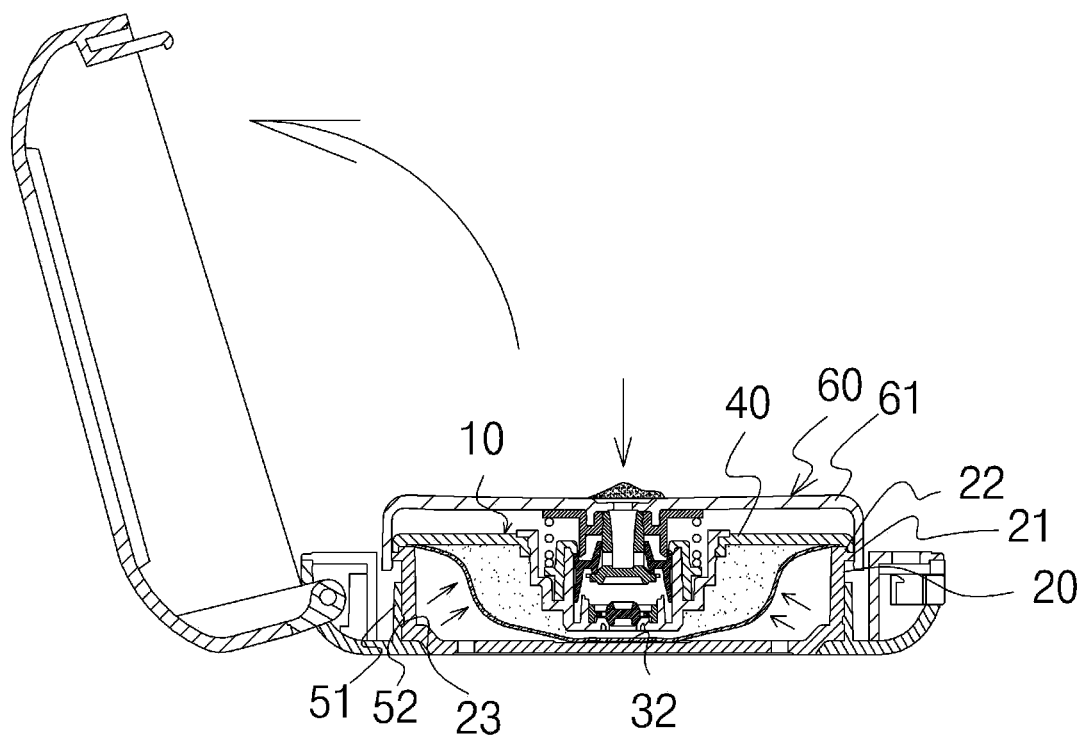
FIG. 4 is a sectional view of a cosmetics compact case in which a film container is contracted by an operation of a discharge pump of FIG. 3.

As shown in FIG. 4, contents accommodated in the film container 32 are discharged through a discharge hole formed in the button 61 by opening a lid of the cosmetics compact case 40 and pressing the button of the discharge pump 60. Then, as the contents are discharge while the film container 32 attached to the inner container 20 is separated from the inner container 20, the film container 32 is contracted and distorted.

If the pumping operation continues and the contents are completely consumed, the film container 32 is attached to a bottom of the discharge pump 60 and is contracted to a peripheral portion of the discharge pump such that the contents are not left.

Figure 6:
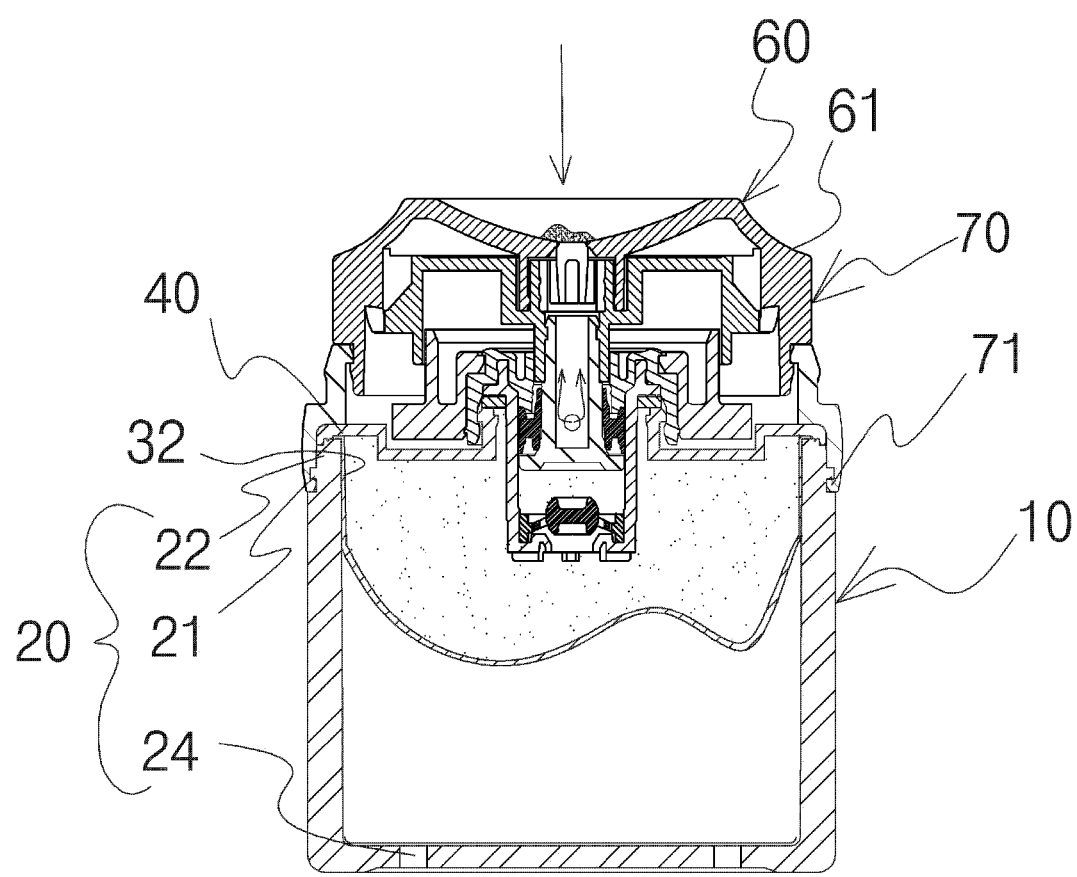
FIG. 6 is a sectional view of an airless cosmetics container in which a film container is contracted by an operation of a discharge pump of FIG. 5.

As shown in FIG. 6, in the airless cosmetics container 70 according to another embodiment of the present invention, contents accommodated in the film container 32 are discharged through a discharge hole formed in the button 61 by opening a lid of the airless cosmetics case 70 and pressing the button 61 of the discharge pump 60. Then, as the film container 32 attached to the inner container 20 is separated from the inner container 20, the film container 32 is contracted and distorted.

If the pumping operation continues and the contents are completely consumed, the film container 32 is attached to a bottom of the discharge pump 60 and is contracted to a peripheral portion of the discharge pump such that the contents are not left.

Meanwhile, the present invention is not limited to the embodiments, but may be changed and modified without departing from the spirit of the present invention. For example, the vacuum container of the present invention can be applied to various products such as an airless container, a discharge pump container, and an essence cosmetics container in addition to a compact case having a small height, and the changes and modifications fall within the technical spirit of the present invention.

DESCRIPTION OF REFERENCE NUMERALS

10: Vacuum container
20: Inner container
32: Film container
40: Inner container cover
50: Cosmetics compact case
60: Discharge pump
70: Airless cosmetics container

The invention claimed is:

1. A method of manufacturing a vacuum container, the method comprising:
   forming an inner container of a synthetic resin, the inner container including at least a bottom plate, a periphery and an inner surface, the inner surface having a shape;
   positioning a thin film formed of at least one of polypropylene (PP), polyethylene (PE), polyethyleneterephthalate, acrylonitrile butadiene styrene copolymer (ABS), poly cyclohexylene dimethylene terephthalate (PCTG), polyvinyl alcohol (PVA), polyurethane (PU), polyvinylchloride (PVC), saline, a silicon resin, a natural rubber, and a synthetic resin on the inner container;
   heating an upper side of the thin film positioned on the inner container with at least one of hot air and a heating plate;
   suctioning air through a vacuum suction hole formed on the bottom plate of the inner container, thereby attaching the thin film to the inner surface of the inner container, and defining a film container having a shape, the shape of the film container conforming to the shape of the inner surface of the inner container;
   cutting a periphery of the film container attached to the inner container according to a size of the periphery of the inner container;
   covering the inner container and the film container with an inner container cover while the film container is attached to the inner container; and
   bonding the periphery of the inner container, a periphery of the film container, and a periphery of the inner container cover.

2. The method of claim 1, wherein the periphery of the inner container, the periphery of the film container, and the periphery of the inner container cover are bonded through ultra-wave fusion.

3. The method of claim 1, wherein a temperature of the at least one of the hot air and the heating plate is 90° C. to 140° C. when the film container is formed.

4. The method of claim 3, wherein a temperature of the at least one of the hot air and the heating plate is 110° C. to 120° C. when the film container is formed.

* * * * *